United States Patent [19]
Cronin

[11] 3,728,345
[45] Apr. 17, 1973

[54] PREPARATION OF QUINOXALINE-2-CARBOXAMIDE DERIVATIVES

[75] Inventor: Timothy Henry Cronin, Niantic, Conn.

[73] Assignee: Pfizer Inc., New York, N.Y.

[22] Filed: Mar. 19, 1971

[21] Appl. No.: 126,342

[52] U.S. Cl. ............................... 260/250 R, 424/250
[51] Int. Cl. ................................................. C07d 51/78
[58] Field of Search .................................. 260/250 R

[56] References Cited

UNITED STATES PATENTS 3,557,109  1/1971  Ley et al. ...................... 260/250 R
3,558,624  1/1971  Ley et al. ...................... 260/250 R
3,598,820  8/1971  Ley et al. ...................... 260/250 R
3,639,400  2/1972  Nast et al. ..................... 260/250 R

*Primary Examiner*—Nicholas S. Rizzo
*Attorney*—Connolly & Hutz

[57] ABSTRACT

Process for the preparation of N-(hydroxyalkyl)-2-quinoxalinecarboxamide-1,4-dioxides through treatment of 2-quinoxalinecarboxylic acid, aminoalkyl ester, 1,4-dioxide acid addition salts with a base in a reaction-inert solvent at 10°–60° C. and pH of 7–14.

5 Claims, No Drawings

PREPARATION OF QUINOXALINE-2-CARBOXAMIDE DERIVATIVES

BACKGROUND OF THE INVENTION

This invention relates to a novel synthetic process for the production of quinoxaline-1,4-dioxides, useful as antibacterial agents.

Continuing synthetic efforts to discover new and more useful antibacterial agents have led, over the years, to the development of a variety of prototype organic compounds including numerous analogs of quinoxaline-1,4-dioxides. Lanquist, et al., J. Chem. Soc., 2052 (1956), in a search for compounds of improved antibacterial and antiprotozoal activity, reported the preparation of several derivatives of 2-methyl- and 2,3-dimethylquinoxaline-1,4-dioxides using the procedure of Wegmann, et al., Helv. Chim. Acta., 29, 95 (1946) which comprised condensation of a 1,2-dione with o-phenylenediamine followed by peracid oxidation of the quinoxaline to the di-N-oxide. More recently, Haddadin, et al., Tetrahedron Letters, 3253 (1965), demonstrated the synthesis of quinoxaline-di-N-oxides in a single step reaction utilizing a benzofuroxan and an enamine. This same group was also successful in condensing benzofuroxans with certain 1,3-diketones and $\beta$-ketoesters in the presence of a basic catalyst to yield quinoxaline-1,4-dioxides, J. Org. Chem., 31, 4067 (1966). Ley, et al., Angew Chem. internat. Edit., 8, 596 (1969), have corroborated the synthesis of quinoxaline-di-N-oxides from ketones and benzofuroxans and have shown that this latter reagent can be reacted in the presence of ammonia with phenols and quinone derivatives to provide phenazine-di-N-oxide analogs. By employing benzofuroxan and N-(substituted)alkyl-acetoacetamides in the presence of ammonia or primary amines, it has been demonstrated, Belgium Pat. No. 721,724, that N-(substituted alkyl)-2-quinoxalinecarboxamide-1,4-dioxides can be synthesized.

SUMMARY OF THE INVENTION

It has now been found that treatment of acid addition salts of 2-quinoxalinecarboxylic acid, aminoalkyl esters, 1,4-dioxides with a base in a reaction-inert solvent, leads to the formation of N-(hydroxyalkyl)-2-quinoxalinecarboxamide-1,4-dioxides, a class of compounds valuable for their antibacterial activity against pathogenic microorganisms.

The process of this invention comprises treating the acid addition salt of an aminoalkyl ester of a 2-quinoxalinecarboxylic acid of the formula:

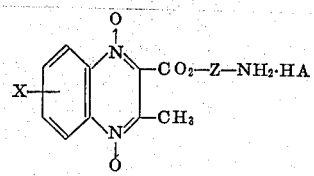

wherein X is a substituent at the 6- or 7-position selected from the group consisting of hydrogen, fluorine, chlorine, bromine, trifluoromethyl, methyl and methoxy; Z is selected from the group consisting of ethylene, propylene and alkyl substituted ethylene and propylene said alkyl group containing from one to three carbon atoms; and A is an acid anion, with at least an equivalent amount of a base in a reaction-inert solvent at 10°–60° C. and pH of 7–14. Said reation is depicted by the following scheme:

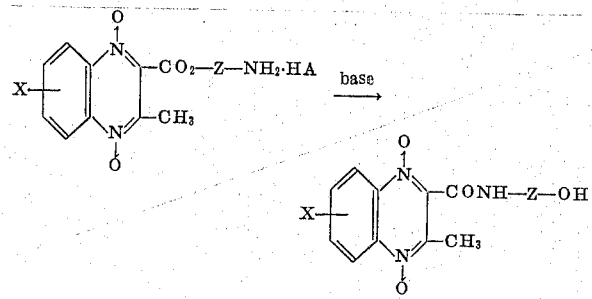

By reaction-inert solvent is meant a solvent which, under the conditions of the instant process, does not enter into any appreciable reaction with either the reactants of the products. Aqueous and non-aqueous solvents can be used. The use of water as the solvent can, of course, result in some hydrolysis of either the ester starting material or amide product. However, under the proper conditions of temperature, basicity and time, the hydrolysis can be reduced to a minimum. Suitable solvents which are lncluded in this group encompass N,N-di(lower)alkyl(lower)alkylcarboxamides, di(lower)alkylsulfoxides, ethers, (lower)alkanols, (lower)alkylketones, water and liquid aromatic hydrocarbons. Especially useful as solvents are dimethylformamide, tetrahydrofuran, dimethylsulfoxide, acetone, dioxane and benzene. Also applicable as a suitable solvent, having an inherent basic nature, are liquid primary, secondary and tertiary amines including triethylamine, pyridine and 1-methylpiperidine. Aqueous solvent systems, including those in which an emulsion is formed, e.g., water-water immiscible solvent, can also be employed. Solvents which readily form emulsions with water include those water immiscible solvents such as benzene, n-butanol, methylene chloride, chloroform, methyl isobutyl ketone, and (lower)alkyl acetates. The favored water immiscible solvents are methylene chloride and methyl isobutyl ketone.

Also included within the scope of the present process is preparation of N-hydroxyalkylamides wherein the alkyl moiety, Z, is 1,4-butylene through 1,6-hexylene, as well as congeners wherein Z is part of a cycloalkyl ring, e.g., 1,3-cyclopentylene, 1,3-cyclopentylene and 1,4-cyclohexylene.

Of particular interest in the process of the present invention are the conversion of acid addition salts of 3-methyl-2-quinoxalinecarboxylic acid, aminoalkyl ester, 1,4-dioxides to 3-methyl-2-(N-hydroxyalkyl) quinoxalinecarboxamide- 1,4-dioxides wherein A is chloride ion, Z is ethylene and X is selected from the group consisting of hydrogen, fluorine, chlorine, bromine, trifluoromethyl, methyl and methoxy.

DETAILED DESCRIPTION OF THE INVENTION

The reaction is conducted over a pH range of 7–14 and, preferably, over the pH range of 8–9. The pH is maintained in the basic range by the addition of any suitable acid acceptor. Any base can be employed for the herein described process. Typical preferred examples include alkali metal and alkali earth metal hydroxides, hydrides alkoxides, carbonates and bicarbonates, e.g., sodium hydroxide, potassium hydroxide, lithium hydroxide, calcium hydroxide, barium hydroxide, magnesium hydroxide, sodium hydride, calcium hydride, sodium methoxide, potassium t-butoxide, sodium carbonate, sodium bicarbonate, potassium carbonate and calcium carbonate, as well as ammonia. Basic buffers and salts of a strong base and weak acid can also be employed to maintain the pH in the desired range. Suitable organic bases include mono-, di- and tri(lower)-alkylamines, N-(lower)-alkylpiperidines, N-(lower)alkylpyrrolidines and N-(lower)alkylmorpholines. When using an organic base it is preferred to employ, for reasons of availability and economy, a tri(lower)alkylamine, preferably triethylamine. Such organic bases are particularly useful when using a non-aqueous reaction-inert solvent system such as methylene chloride or dimethylformamide. As one skilled in the art can appreciate, the aforementioned liquid organic amines can play a dual role, that of a reaction-inert solvent as well as suitable base.

The amount of base to be employed in the present process varies with the pH range desired. In general, at least an amount of base equivalent to the acid addition salt of the appropriate aminoalkyl ester is employed, with greater amounts if a higher pH is desired. In instances wherein the acid anion, A, is polyvalent, additional amounts of the requisite base will be needed to render the reaction medium basic.

The reaction can be conducted over a wide temperature range; temperatures of from 10°–60° C. are preferred. Lower temperatures tend to impeed the reaction while higher temperatures can result in hydrolysis of the starting ester or amide product, especially when the pH of the medium is in the upper extreme of the pH range.

Reaction time is not critical and is inherently dependent on concentration, reaction temperature and reactivity of the starting reagents.

The combining of the reactants is not critical to the outcome of the herein described process. The reaction-inert solvent can be combined with the requisite base followed by addition of the appropriate acid addition salt of the aminoalkyl ester or, alternately, a solution or suspension of the aforementioned acid addition salt in the reaction solvent can be treatd with the appropriate basic reagent.

The hydroxyalkylamide products of the present process are isolated by conventional methods known to those skilled in the art. For example, the reaction solvent or solvents can be removed under reduced pressure and the residue, consisting of the products plus salts, treated with water to dissolve said salts leaving the insoluble product to be filtered. Alternately, the residue can be extracted with one or more organic solvents leaving the salts as the residue. The organic solvent or solvents containing the desired product are subsequently removed under reduced pressure.

When a water-water immiscible solvent system is employed for the present process, the work-up conditions consist of adding solid sodium chloride to the completed reaction, thus salting any residual product from the aqueous layer into the water-immiscible organic layer, followed by separation of said organic layer. The product is isolated by removal of the dried solvent in vacuo.

The appropriate solvents and basic reagents employed in the process of the present invention are either commerically available or easily obtainable by literature procedures well known to those skilled in the art.

The acid addition salts of the aminoalkyl esters of 3-methyl-2-quinoxalinecarboxylic acid 1,4-dioxide are obtained by the following sequence of reactions:

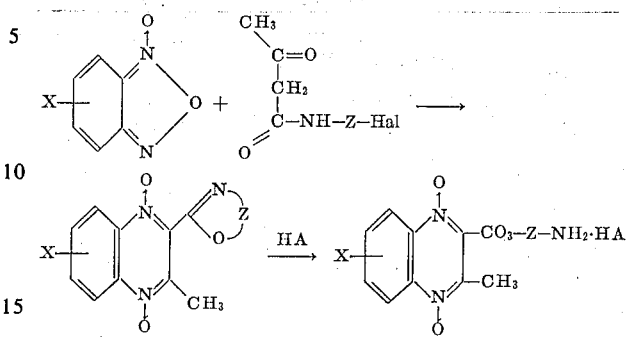

The first reaction in the above-described scheme, wherein X, Z and A are as previously indicated and Hal is Cl or Br, comprises a reaction between a benzofuroxan and an acetoacetamide substituted on the amide nitrogen by an ω-halo (Cl or Br) alkylene moiety giving rise to a 2-(1,3-oxazacyclic-3-methylquinoxaline-1,4-dioxide. In practice, a solution or suspension of the appropriately substituted benzofuroxan and the requisite acetoacetamide in a reaction-inert solvent such as ethanol, N,N-dimethylformamide, benzene, tetrahydrofuran, chloroform or hexamethylphosphoramide is treated with an alkoxide, e.g., sodium ethoxide. It is preferable to use at least an equimolar amount of the benzofuroxan and acetoacetamide, while the amount of base may be two equivalents or slightly greater. The reaction is carried out at ambient temperatures, although it may be heated to 100° C. to hasten product formation. Reaction time is not critical, but will vary depending on the reactivity of the starting materials, temperature and solvent employed. Substantial yields of the desired products are isolated with reaction periods of 15 minutes to 24 hours.

The requisite benzofuroxans and acetoacetamides are either readily available or easily prepared by those skilled in the art. For instance, the synthesis of variously substituted benzofuroxans is described by Kaufman, et al., in Advan. Heterocyclic Chem. 10, 1 (1969), while the N-substituted acetoacetamide derivatives employed as starting materials are easily synthesized as taught by the method of D'Angeli, et al., Tetrahedron Letters, 605 (1965).

Quinoxaline-di-N-oxide intermediates of the instant process invention result from the condensation of benzofuroxan and substituted benzofuroxans with acetoacetamides such that the 2- and 3-positions of the resulting annellated structure represent the carbonyl carbon and the carbon of the active methylene group of the acetoacetamide.

The substituents on the benzene moiety of the 3-methyl-2-(1,3oxazacyclic) quinoxalne-1,4-dioxide can vary widely. For example, at least one of the following substituents can be present: hydrogen, methyl, methoxy, chloro, fluoro, bromo and trifluoromethyl. In like manner, the substituents may include methylthio, methylsulfonyl, methylsulfinyl, trifluoromethylthio, trifluoromethoxy, acetyl, amino, nitro, dimethylamino, acetamido, sulfamyl and mono- and dimethylsulfamyl, methylsulfonylamino, mercapto, hydroxy, acetoxy, carboxy, carboxamido and mono- and dimethylcarboxamido, cyano, aldehydo and phosphono. The favored positions on the fused benzene ring of said final products are the 6- or 7-positions. The favored positions on the fused benzene ring of said final products are the 6- or 7-positions. The favored positions for substituents on the aryl ring of the starting benzofuroxans leading to said final products are the 5-or 6-positions. When one of said substituted benzofuroxans is condensed with the requisite acetoacetamide, a 6- and 7-substituted quinoxaline-di-N-oxide are produced. This multiple product formation results beause of the two orientation possibilities of the acetoacetate fragment in the final product. For example, if one reacts a 5-substituted benzofuroxan of the formula:

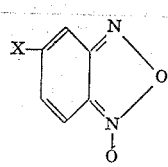

with a reactant $CH_3COCH_2CONH-Z-Hal$, two products, a 6- and 7-substituted quinoxaline-di-N-oxide, result as shown by the formulae:

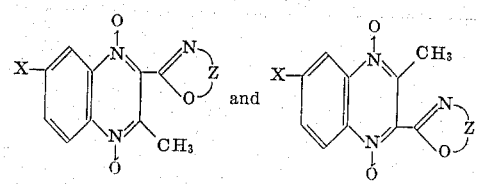

If the corresponding 6-substituted benzofuroxan is employed as the starting material, the same two possible products are formed.

The mixture of isomers is recovered by methods known to those skilled in the art. In many of the preparations disclosed wherein a solid, often crystalline material, separates from the reaction mixture, the solid appears to consist predominantly of one of the isomers. Said isomer can be purified by repeated recrystallization from a suitable solvent to a constant melting point. The other isomer, the one present in smaller amounts in the originally isolated solid material, is the predominant product in the mother liquor. It can be recovered therefrom by methods known to those skilled in the art, as for example, the evaporation of the mother liquor and repeated crystallization of the residue to a product of constant melting point. Alternatively, the reaction mixture can be extracted either before or after evaporation to dryness.

Although said mixtures may be separated by methods known to those skilled in the art, for practical reasons it is advantageous to use said mixtures as they are isolated from the reaction. Futher it is frequently advantageous to purify these mixtures of isomers by at least one recrystallization from an appropriate solvent or by trituration in an appropriate solvent. Said recrystallization or trituration thus allows the separation of the mixture of positional isomers from such extraneous materials as starting material and undesirable by-products.

The identification of the isomers has not been completed. Both isomers of a given compound, however, exhibit the same type of activity, e.g., as animal growth promotants or as antibacterial agents.

Hydrolysis of the aforementioned oxazacyclic moiety at the 2-position of the appropriate 3-methylquinoxaline- 1,4-di-N-oxide, the second reaction in the sequence leading to the starting reagent for the present process invention, is most conveniently carried out using a suitable acid, such as hydrobromic, hydrochloric, phosphoric or sulfuric in a water-water miscible solvent system such as methanol-water or ethanol-water. In general, a 2-5 fold excess of said acid is employed to facilitate the reaction. The hydrolysis is carried out at temperature of 0°–50° C. with a preferred range of 25°–35° C. and for a reaction period of 15 minutes to 2 hours.

The work-up procedure for said reaction consists of removal of excess water, solvent and acid under reduced pressure, followed by trituration of the resulting salt with a suitable solvent, such as ethyl acetate or isopropanol. It is advantageous, whenever possible, to employ the same acid for the hydrolysis as is desired as the salt of the final product. For example, it the hydrochloride salt is desired than hydrochloric acid is employed, the sulfate salt — sulfuric acid, etc.

As one skilled in the art can appreciate, the nature of the acid addition salt HA can vary in nature. Any acid capable of forming an acid addition salt with the aminoalkyl ester is operable in the instant process invention. Said salt can be formed during the aformentioned acid hydrolysis of the 1,3-oxazacyclic ring or a salt exchange can be carried out wherein one acid addition salt can be exchanged for another. For example, the original hydrolysis can be carried out with hydrochloric acid followed by isolation of the hydrochloride salt. Treatment of said salt in an aqueous solution with an equivalent amount of silver oxide results in the precipitation of silver chloride and an aqueous solution or suspension of the free aminoalkyl ester base. After filtration or decantation from the precipitated silver chloride, the base can be treated with the same or different acid giving rise to the same or different acid addition salt. As previously mentioned, said acid addition salt can be either inorganic or organic in nature.

The valuable products of this invention are remarkably effective in treating a wide variety of pathogenic micro-organisms. They are, therefore, useful as industrial antimicrobials, for example, in water treatment, slime-control, paint preservation and wood preservation as well as for topical application purposes as disinfectants.

For example, typical inorganic acids include hydrochloric, hydrobromic, hydrofluoric, hydroiodie, sulfuric, sulfurous, nitric, nitrous, phosphoric, phosphorous, hydrazoic, hydrocyanic, hydrofluosilicic and perchloric. Typical organic acids include alkanoic acids, e.g., acetic, formic butyric, trifluoroacetic, trichloroacetic, thioglycolic, mercaptoacetic, caprylic and capric; alkanepolycarboxylic acids, e.g., oxalic, malonic, succinic, sebacic, tartaric, camphoronic, tartronic and malic; arylalkanoic acids, e.g., phenylacetic, 2-naphthylacetic, 2-thiophenepropionic, phenylmalonic and indoleacetic; arylcarboxylic, e.g., benzoic, 2-naphthoic, 2-thiophenecarboxylic, 2-picolinic, and pyrazinoic; sulfonic acids, e.g., methanesulfonic, p-toluenesulfonic, 10-camphorsulfonic acid and butanesulfonic. Also included are cylcloalkanecarboxylic acids, barbutaric acids, 5-monosubstituted tetrazoles, N-sulfonylureas and acid resins.

For in vitro use, e.g., for topical application, it will often be convenient to compound the selected product with a pharmaceutically acceptable carrier such as vegetable or mineral oil or an emollient cream. Similarly, they may be dissolved or dispensed in liquid carriers or solvents such as water, alcohol, glycols or mixtures thereof or other pharmaceutically acceptable inert media, that is, media which have no harmful effect on the active ingredient. For such purposes, it will generally be acceptable to employ concentrations of active ingredients of from about 0.01 percent to about 10 percent by weight based on total composition.

In determining the in vitro activity of the herein described antibacterial agents, the sensitivity of the various micro-organisms is determined by the commonly accepted two fold serial dilution technique. Final concentrations of compound per ml. range from 100 mcg. in the first tube to 0.19 mcg. in the tenth tube. The inoculum consists of 0.5 ml. of a $1 \times 10^{-3}$ dilution of a standardized culture. Final volume in each tube or cup in the DisPoso tray is 1.0 ml. The tubes are incubated at 37° C. for approximately 24 hours. The medium used is Witkins synthetic or Brain Heart Infusion (BHI). The sensitivity (MIC — minimal inhibitory concentration) of the test organism is accepted as evidenced by the absence of gross turbidity.

Further, compounds described herein exhibit broad spectrum activity, that is, activity against both gram-negative and gram-positive bacteria, in contrast to the usual gram-negative activity of quinoxaline-di-N-oxides. Additionally, they are active in vivo.

When used in vivo for such purposes, these novel compounds can be administered orally or parenterally, e.g., by subcutaneous, intramuscular, or intravenous injection, at a dosage of from about 1 mg./kg. to about 100 mg./kg. of body weight. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide and other non-aqueous vehicles which will not interfere with therapeutic efficiency of the preparation and are nontoxic in the volume or proportion used (glycerol, propylene glycol, sorbitol and dimethylacetamide). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. These compounds may also be combined with various pharmaceutically acceptable inert carriers including solid diluents, aqueous vehicles, nontoxic organic solvents in the form of capsules, tablets, lozenges, troches, dry mixes, suspensions, solutions, elixirs and parenteral solutions or suspensions. In general, the compounds are used in various dosage forms at concentration levels ranging from about 0.5 percent to about 90 percent by weight of the total composition.

The in vivo efficacy of the compounds of the instant invention is determined by the antibacterial activity against acute infections in mice. The acute experimental infections are produced by the intraperitoneal inoculation of standardized culture suspended in either 5 percent hog gastric mucin or broth. A brief discussion of the words "standardized culture" would seem to be beneficial. In order to obtain reproducible results with a test compound it is necessary to control, as much as possible, the many variables that can enter into this type of test. An organism of high virulence if used in large enough numbers can make almost any drug look inactive. On the other hand, an inoculum not able to produce a measurable difference between treated and untreated groups is equally lacking in purpose.

Stock cultures of test organisms are normally maintained on slants or in liquid medium. When not routinely used they are maintained at refrigerator temperature or in a lyophilized state. When it becomes necessary to use a culture in animal protection tests the culture is suspended in a volume of saline or broth, and the density of the suspension is measured by a photoelectric colorimeter. From this stock, 10-fold dilutions are prepared. Each dilution is inoculated into a series of mice in order to determine the $LD_{100}$, the $LD_{100}$ being the lowest concentration of organisms required to produce 100 percent deaths. For example, if it is found that a dilution of $10^{-4}$ is the lowest level of organism that will produce 100 percent death, an inoculum of $10^{-3}$ would probably be used for the drug evaluation experiments. This means that we are using about 10 $LD_{100}$ or 10 times the minimum dose required to kill mice. Such a test would also include the use of control animals which receive an inoculum of $10^{-4}$, $10^{-5}$, and possibly $10^{-6}$. These dilutions are included as a check on possible variation in virulence which can occur. Having previously determined, through the virulence titration, that $10^{-4}$ was the maximum dilution that will kill we naturally expect these animals to die, usually within 24 hours.

Each organism has its own standardized inoculum level. Some, such as Staphylococcus, may be used at $10^{-1}$, while others like Streptococcus require weekly animal passage in order to maintain virulence.

When evaluating an antibacterial agent for its effectiveness after a single dose the dose is usually administered 0.5 hour after inoculating the mice with the lethal concentration of organisms. In this type of treatment schedule surviving mice are usually held for four days after the treatment and the percent alive is calculated.

The addition of a low level of one or more of the herein described N-hydroxyalkyl-3-methyl-2-quinoxalinecarboxamide-di-N-oxides to the diet of healthy animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improved feed efficiency. Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals and other factors known to be required for the maximum healthy growth of such animals. The animals thus attain market size sooner and on less feed.

The herein described feed compositions have been found to be particularly valuable and outstanding in the case of swine. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds.

The resulting new feed compositions have marked effects on the rate of growth and feed efficiency (the number of pounds of feed required to produce a pound gain in weight). Any animal feed composition may be prepared to comprise the usual nutritional balance of energy, proteins, minerals and vitamins together with one or more of the quinoxaline-di-N-oxides described above. Some of the various components are commonly grains such as ground grain and grain by-products; animal protein substances, such as meat and fish by-products; vitaminaceous mixtures, e.g., vitamin A and D mixtures, riboflavin supplements and other vitamin B complexes; and bone meal, limestone and other inorganic compounds to provide minerals.

The relative proportions of the present compounds in feeds and feed concentrates may vary somewhat, depending upon the compound, the feed with which they are employed and the animal consuming the same. These substances are advantageously combined in such relative proportions with edible carriers to provide premixes or concentrates which may readily be blended with standard nutritionally balanced feeds or which may be used themselves as an adjunct to normal feedings.

In the preparation of concentrates a wide variety of carriers may be employed containing the aforesaid drugs. Suitable carriers include the following: soybean oil meal, cornmeal, limestone and corncob meal. The carrier facilitates uniform distribution of the active materials in the finished feed with which the concentrate is blended. This is especially important because only a small proportion of these potent materials are required. The concentrate may be surface coated, if desired, with various proteinaceous materials or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e., premixes, suitable for blending by feed manufacturers to produce finished feeds or concentrates of lower potency, the drug content may range from about 0.1 g. to 50 g. per pound of concentrate. A particularly useful concentrate is provided by blending 2 g. of drug with 1 pound of limestone or 1 pound of limestone-soybean oil meal (1:1). Other dietary supplements, such as vitamins, minerals, etc., may be added to the concentrates in the appropriate circumstances.

The high potency concentrates may be blended by the feed manufacturer with proteinaceous carriers, such as soybean oil meal, to produce concentrated supplements which are suitable for direct feeding to animals. In such instances, the animals are permitted to consume the usual diet of corn, barley and other fibrous grains and the like. The proportion of the drug in these supplements may vary from about 0.1 to 10 g. per pound of supplement.

The concentrates described may also be added to animal feeds to produce a nutritionally balanced, finished feed containing from about 5 to about 125 g. of the herein described compounds per ton of finished feed.

In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran and dried molasses. Bone meal, limestone, iodized salt and trace minerals are frequently added to supply the necessary minerals and urea to provide additional nitrogen.

As is well known to those skilled in the art, the types of diets are extremely variable depending upon the purpose, type of feeding operation, species, etc. Specific diets for various purposes are listed by Morrison in the Appendix of "Feeds and Feeding," the Morrison Publishing Company, Clinton, Iowa, 1959.

In the case of non-ruminant animals, such as hogs, a suitable feed may contain from about 50 to 80 percent of grains, 3 to 10 percent animal protein, 5 to 30 percent vegetable protein, 2 to 4 percent of minerals, together with supplementary vitaminaceous sources.

Unique among the products of the present process invention by reason of their outstanding broad spectrum activity and/or significant growth promoting activity in swine are N-(2-hydroxyethyl)-3-methyl-2-quinoxalinecarboxamide-1,4-dioxide and N-(2-hydroxyethyl)-6(or 7)-chloro-3-methyl-2-quinoxalinecarbox-amide-1,4-dioxide.

The following examples are provided solely for the purpose of illustration and are not to be construed as limitations of this invention, many variations of which are possible without departing from the spirit or scope thereof.

EXAMPLE I

N-(2-Hydroxyethyl)-3-methyl-2-quinoxalinecarboxamide-1,4-dioxide. Method A

3-Methyl-2-quinoxalinecarboxylic acid, 2-aminoethyl ester, 1,4-dioxide hydrochloride (0.0168 mole) in 10 ml. of water is treated with sufficient potassium carbonate to provide a pH of 8.5–9.0 and the resulting reaction mixture allowed to stir overnight. An additional 15 ml. of water is added and the pH adjusted from 7 to 9–10 by the addition of more potassium carbonate. After allowing the mixture to stir for 15–30 minutes it is chilled in ice and the precipitated solids filtered. The filter cake is washed with cold water, cold acetone and finally air dried, 4.0 g., m.p. 202°–203° C. (dec.). Additional purification is effected by recrystallization from methanol-chloroform. The product is the same in every respect with that formed through the condensation of benzofuroxan and N-(2-hydroxyethyl)acetoacetamide*. (*A solution of 2-hydroxyethylamine (4.58 g., 0.075 mole) in N,N-dimethylformamide (50 ml.) is added to a stirred solution of diketene (4.2 g., 0.05 mole) in ether (30 ml.) at a temperature of 20° C. Benzofuroxan (8.6 g., 0.05 mole) is then dissolved in the reaction mixture with good stirring. The mixture is allowed to stand at room temperature overnight and the product filtered off. Recrystallization from methanol:chloroform (1:1) yields the pure product; m.p. 209°–210° C. (dec.).

Similar results are obtained when potassium carbonate is substituted by sodium, potassium, lithium and calcium hydroxides.

EXAMPLE II

Following the procedure of Example I and employing the hydrochloride salts of the appropriate starting reagents, the following N-(ω-hydroxyalkyl)-3-methyl-2-quinoxalinecarboxamide-1,4-dioxides are prepared:

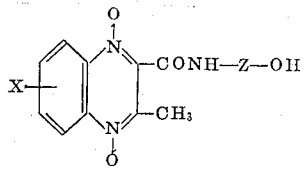

| X | Z | m.p. °C. |
|---|---|---|
| H | —CH$_2$CH(CH$_3$)— | 196–197 |
| 6-(or 7)Cl | —CH$_2$CH(CH$_3$)— | 207–208 |
| 6-(or 7)OCH$_3$ | —CH$_2$CH(CH$_3$)— | 215–216 |
| H | —CH(C$_2$H$_5$)CH$_2$— | 189–190 |
| 6-(or 7)Cl | —CH(C$_2$H$_5$)CH$_2$— | 188–189 |
| H | —C(CH$_3$)$_2$CH$_2$— | 227–228 |
| 6-(or 7)Cl | —C(CH$_3$)$_2$CH$_2$— | 219–220 |
| 6-(or 7)Cl | —CH$_2$CH$_2$— | 214 |

EXAMPLE III

The procedure of Example I is again repeated, starting with the corresponding hydrobromide salts of the requisite 3-methyl-2-quinoxalinecarboxylic acid, ω-aminoalkyl ester, 1,4-dioxides:

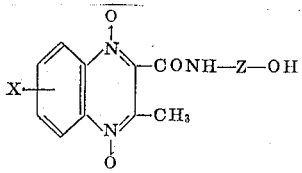

| X (6 or 7) | Z | X (6 or 7) | Z |
|---|---|---|---|
| F | —CH$_2$CH$_2$— | F | —CH(CH$_3$)CH(CH$_3$)— |
| Br | —CH$_2$CH$_2$— | F | —CH(C$_2$H$_5$)CH$_2$— |
| CH$_3$ | —CH$_2$CH$_2$— | F | —CH(C$_6$H$_5$)CH$_2$— |
| OCH$_3$ | —CH$_2$CH$_2$— | OCH$_3$ | —CH(n-C$_3$H$_7$)CH$_2$— |
| CF$_3$ | —CH$_2$CH$_2$— | Br | —CH(n-C$_3$H$_7$)CH$_2$— |
| CF$_3$ | —CH(CH$_3$)CH$_2$— | CH$_3$ | —CH$_2$CH$_2$— |
| CF$_3$ | —CH$_2$CH(CH$_3$)— | CH$_3$ | —CH(CH$_3$)CH$_2$— |
| CF$_3$ | —C(CH$_3$)$_2$CH$_2$— | CH$_3$ | —CH$_2$CH(CH$_3$)— |
| OCH$_3$ | —C(CH$_3$)$_2$CH$_2$— | CH$_3$ | —CH(i-C$_3$H$_7$)CH$_2$— |
| F | —CH$_2$CH(CH$_3$)— | F | —CH(CH$_3$)C(CH$_3$)$_2$— |
| F | —CH(CH$_3$)CH$_2$— | Cl | —CH(CH$_3$)C(CH$_3$)$_2$— |
| Br | —CH(CH$_3$)CH$_2$— | Br | —CH(CH$_3$)CH(CH$_3$)— |

In a similar manner the above products are obtained when the acid addition salts of the requisite starting ω-aminoalkyl esters are derived from nitric acid, sulfuric acid, hydrofluoric and hydroiodic acid.

EXAMPLE IV

N-(2-Hydroxyethyl)-3-methyl-2-quinoxalinecarboxamide-1,4-dioxide — Method B

A solution of 4.35 g. (0.01 mole) of 2-methyl-2-quinoxalinecarboxylic acid, 2-aminoethyl ester, 1,4-dioxide p-toluenesulfonic acid salt in 50 ml. of N-methylpiperidine is heated to 45° C. for 0.5 hour, followed by the removal of the solvent under reduced pressure. The residue is extracted several times with a 1:1 mixture of chloroform-methanol and the extracts subsequently combined and concentrated to dryness in vacuo. The desired product is recrystallized from methanol-chloroform-ether, and is identical to that prepared by Method A of Example I.

EXAMPLE V

Employing the corresponding acetate, benzoate and oxylate acid addition salts of the appropriate ω-aminoalkyl esters and repeating the procedure of Example IV, the following products are obtained:

N-(1-methyl-3-hydroxypropyl)-3-methyl-2-quinoxalinecarboxamide-1,4-dioxide, m.p. 172°–173° C.;

N-(3-hydroxypropyl)-3-methyl-2-quinoxalinecarboxamide-1,4-dioxide, m.p. 170°–171° C.;

N-(1-methyl-3-hydroxypropyl)-3-methyl-6(or 7)-chloro-2-quinoxalinecarboxamide-1,4-dioxide, m.p. 174°–175° C.;

N-(3-hydroxypropyl)-3-methyl-6(or 7)-chloro-2-quinoxalinecarboxamide-1,4-dioxide, m.p. 189°–190° C.; and N-(3-hydroxypropyl)-3-methyl-6(or 7)-methoxy-2-quinoxalinecarboxamide-1,4-dioxide, m.p. 193°–194° C.

EXAMPLE VI

N-(3-Hydroxypropyl)-3-methyl-2-quinoxalinecarboxamide-1,4-dioxide. Method C.

To a mixture of 25 ml. of water and 35 ml. of methyl isobutyl ketone is added 3.6 g. (0.01 mole) of 2-methyl-3-quinoxalinecarboxylic acid, 3-aminopropyl ester, 1,4-dioxide hydrophosphate salt, followed by sufficient solid sodium ethoxide to raise the pH of the mixture to 9.0–9.5. The reaction mixture is allowed to stir at room temperature for 1.5 hours at which time thin-layer-chromatography indicates the starting material is completely converted to the desired product. Solid sodium chloride is added to the reaction mixture and the organic phase separated, dried over sodium sulfate and concentrated to dryness in vacuo. The residual product which is triturated in ether and filtered is identical in every respect to that prepared in Example V wherein the basic medium is N-methylpiperidine.

EXAMPLE VII

Starting with the hydrochloride addition salts of the requisite 3-methyl- 2-quinoxalinecarboxylic, ω-aminoalkyl ester, 1,4-dioxides and potassium t-butoxide, and repeating the procedure of Example VI, the following products are prepared:

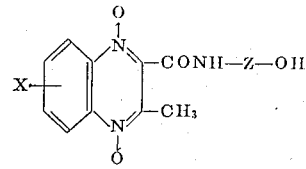

| X (6 or 7) | Z |
|---|---|
| CH$_3$ | —CH$_2$CH$_2$CH$_2$— |
| CF$_3$ | —CH$_2$CH$_2$CH$_2$— |
| F | —CH$_2$CH$_2$CH$_2$— |
| Br | —CH$_2$CH$_2$CH$_2$— |
| CF$_3$ | —CH(CH$_3$)CH$_2$CH$_2$— |
| OCH$_3$ | —CH(CH$_3$)CH$_2$CH$_2$— |
| F | —CH(CH$_3$)CH$_2$CH$_2$— |
| Cl | —CH$_2$CH(CH$_3$)CH$_2$— |
| Cl | —CH$_2$CH$_2$CH(CH$_3$)— |
| Cl | —CH$_2$C(CH$_3$)$_2$CH$_2$— |
| Cl | —CH(CH$_3$)CH$_2$CH(CH$_3$)— |
| CF$_3$ | —CH(CH$_3$)CH$_2$CH(CH$_3$)— |
| F | —CH(CH$_3$)CH$_2$CH(CH$_3$)— |
| CH$_3$ | —CH(C$_2$H$_5$)CH$_2$CH$_2$— |
| F | —CH(C$_2$H$_5$)CH$_2$CH$_2$— |
| Cl | —CH$_2$CH(n-C$_3$H$_7$)CH$_2$— |
| H | —CH$_2$CH(n-C$_3$H$_7$)CH$_2$— |
| H | —CH(CH$_3$)CH$_2$CH(CH$_3$)— |
| H | —CH(CH$_3$)CH$_2$C(CH$_3$)$_2$— |
| Br | —C(CH$_3$)$_2$CH$_2$CH$_2$— |
| CH$_3$ | —C(CH$_3$)$_2$CH$_2$CH$_2$— |
| OCH$_3$ | —CH$_2$C(CH$_3$)(C$_2$H$_5$)CH$_2$— |
| H | —CH$_2$C(CH$_3$)(C$_2$H$_5$)CH$_2$— |
| Cl | —CH$_2$CH(i-C$_3$H$_7$)CH$_2$— |
| H | —CH$_2$CH(i-C$_3$H$_7$)CH$_2$— |
| F | —CH(CH$_3$)CH(CH$_3$)CH(CH$_3$)— |

EXAMPLE VIII

Employing the aforementioned two-fold serial dilution technique, the in vitro activity of some representative products of the present process invention against *Staphylococcus aureus* and *Escherechia coli* are presented. Benzylpenicillin (K salt) when tested gave MIC (minimal inhibitory concentration) values of 0.156 and >100 vs. *S. aureus* and *E. coli*, respectively.

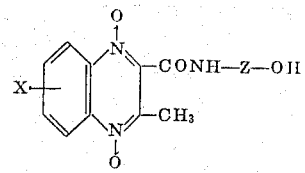

| X | Z | S. aureus | E. coli |
|---|---|---|---|
| H | —CH$_2$CH$_2$— | >200 | 12.5 |
| 6(or 7)—Cl | —CH$_2$CH$_2$— | 100 | 6.25 |
| H | —CH$_2$CH(CH$_3$)— | >200 | 25 |
| H | —CH(CH$_3$)CH$_2$CH$_2$— | >200 | 200 |
| H | —CH(C$_2$H$_5$)CH$_2$— | 100 | >200 |
| H | —CH$_2$CH$_2$CH$_2$— | 100 | 25 |
| 6(or 7)—Cl | —CH(CH$_3$)CH$_2$CH$_2$— | 50 | >200 |

EXAMPLE IX

Using the previously described method for determining in vivo activity, the following representative products of the present process invention were tested orally against *Streptococcus pyogenes* at 200 and 50 mg./kg. and against *Escherechia coli* at 50 and 12.5 mg./kg. unless otherwise indicated, the results being recorded as the percent animals which survived:

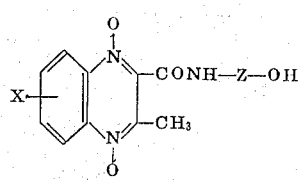

| X | Z | S. pyogenes 200 | 50 | E. coli 50 | 12.5 |
|---|---|---|---|---|---|
| H | —CH$_2$CH$_2$— | 90 | 0 | 90** | 80*** |
| 6(or 7)-Cl | —CH$_2$CH$_2$— | 80 | 10 | 80* | 50** |
| H | —CH$_2$CH(CH$_3$)— | 20 | 0 | 50 | 30 |
| H | —CH(CH$_3$)CH$_2$CH$_2$— | — | — | 50 | 30 |
| H | —CH(C$_2$H$_5$)CH$_2$— | — | — | 10 | 0 |
| H | —CH$_2$CH$_2$CH$_2$— | — | — | 40 | 10 |
| 6(or 7)-Cl | —CH(CH$_3$)CH$_2$CH$_2$— | 50 | 0 | 20 | 0 |
| H | —C(CH$_3$)$_2$CH$_2$— | — | — | 0 | 10 |
| 6(or 7)-Cl | —C(CH$_3$)$_2$CH$_2$— | 40 | 0 | 0 | 10 |

*200 mg./kg.
**100 mg./kg.
***50 mg./kg.

EXAMPLE X

Sixty-four pigs (Conner Prairie crossbreed) 5 to 6 weeks old are divided into two equal groups (A and B). Each group is sub-divided into four sub-groups of eight pigs each (four females and four castrated males) and each subgroup is assigned to a pen. Group A serves as a negative control and is fed only a standard basal ration. The remaining group is fed the same basal ration but which has been supplemented with a growth promotant at 20 grams per ton of ration.

Group B — N-(2-hydroxyethyl)-3-methyl-6(or 7)-chloro-2-quinoxaline-carboxamide-di-N-oxide The ration formulation has the composition shown and is presented ad libitum as is the water. The supplements are added at the expense of the ground yellow corn.

BASAL RATION

| Ingredients | % |
|---|---|
| Ground yellow corn | 58.15 |
| Soybean meal, 50% protein | 19.60 |
| Alfalfa meal, 17% protein | 2.00 |
| Dried skim milk | 5.00 |
| Dried whey | 10.00 |
| Stabilized animal fat (lard or tallow) | 2.50 |
| Dicalcium phosphate | 1.10 |
| Limestone | 0.60 |
| Iodized salt | 0.50 |
| Vitamin premix | 0.50$^a$ |
| Trace mineral premix | 0.05$^b$ |
| Protein (calculated) | 18.00 |
| Calcium | 0.75 |
| Phosphorus | 0.60 |

$^a$Contributed the following levels of vitamins per pound of ration: vitamin A, 2,000 I.U.; vitamin D, 200 I.U.; niacin, 10 mg.; riboflavin, 1.5 mg.; pantothenic acid, 6 mg.; choline chloride, 200 mg.; vitamin B$_{12}$, 10 mcg.
$^b$Contributed the following levels of trace minerals in parts per million: manganese, 120; iron, 40; copper, 4; iodine, 2.4; cobalt, 0.4; zinc, 100.

The individual pigs are weighed prior to the experiment and at regular intervals throughout the 20-day test. The daily consumption of feed is also measured to permit determination of feed efficiency. Pertinent data are presented below (Tables I and II).

TABLE I
Growth Promotion Data

| Group | Sub-group | Average Weight per pen (lbs.) Initial | Final | Average Gain/Pen/Day | Mean | Index |
|---|---|---|---|---|---|---|
| A | 1 | 18.1 | 33.5 | 0.769 | | |
| A | 2 | 20.1 | 37.0 | 0.844 | | |
| A | 3 | 22.1 | 42.0 | 0.994 | | |
| A | 4 | 24.5 | 47.1 | 1.128 | | |
| A | | | | | 0.934 | 100.0 |
| B | 1 | 18.2 | 40.5 | 1.116 | | |
| B | 2 | 20.1 | 42.9 | 1.138 | | |
| B | 3 | 22.1 | 44.4 | 1.116 | | |
| B | 4 | 24.6 | 51.0 | 1.321 | | |
| B | | | | | 1.172 | 125.5 |

TABLE II
Feed Efficienty Data

| group | sub-group | Average Weight per pen Initial | Final | Feed Consumption/pen | Feed/Gain | mean | index |
|---|---|---|---|---|---|---|---|
| A | 1 | 18.1 | 33.5 | 258.8 | 2.102 | | |
| A | 2 | 20.1 | 37.0 | 292.6 | 2.165 | | |
| A | 3 | 22.1 | 42.0 | 352.3 | 2.212 | | |
| A | 4 | 24.5 | 47.1 | 372.2 | 2.060 | | |
| A | | | | | | 2.135 | 100.0 |
| B | 1 | 18.2 | 40.5 | 343.8 | 1.924 | | |
| B | 2 | 20.1 | 42.9 | 324.0 | 1.779 | | |
| B | 3 | 22.1 | 44.4 | 345.9 | 1.936 | | |
| B | 4 | 24.6 | 51.0 | 398.6 | 1.885 | | |
| B | | | | | | 1.881 | 113.4 |

Supplementation of the basal ration with the above-named compound thus brings about economically significant gains in growth and feed efficiency.

PREPARATION A 2-(1,3-Oxazolin-2-yl)-3-methylquinoxaline-1,4-dioxides a. 2-(2-Oxazolin-2-yl)-3-methylquinoxaline-1,4-dioxide A solution of 2-bromoethylamine hydrobromide (21.0 g.) in water (30 ml.) is added to a solution of diketene (8.4 g.) in chloroform (150 ml.) at 0° C. and the mixture stirred vigorously. A solution of sodium hydroxide (4.1 g. in 20 ml. of water) is then added to the stirred mixture over a period of 20 minutes at 0° C. The reaction mixture is allowed to stir at room temperature, and the chloroform layer separated, dried over sodium sulfate and evaporated to dryness to provide the product, N-(2-bromoethyl)acetoacetamide, as a white solid.

The N-(2-bromoethyl)acetoacetamide (20.8 g.) and benzofuroxan (13.6 g.) are dissolved in ethanol (150 ml.), and ethylamine (16 ml.) slowly added to the solution while the temperature is maintained below 30° C. The reaction mixture is allowed to stir at room temperature overnight, followed by filtration of the precipitated product, 6.4 g., m.p. 211° C. Recrystallization from methanol — chloroform raises the melting point to 217°–218° C.

Anal. Calcd. for $C_{12}H_{11}O_3N_3$: C, 58.77; H, 4.52; N, 17.14.

Found: C, 58.23; H, 4.52; N, 17.02.

b. Starting with the requisite benzofuroxan and haloethylamine hydrohalide, and repeating the above procedure, the following intermediates, previously unreported in the chemical literature, are synthesized:

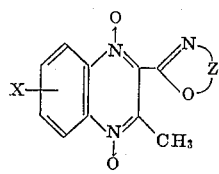

| X (6 or 7) | Z | X (6 or 7) | Z |
|---|---|---|---|
| H | —CH₂CH(CH₃)— | OCH₃ | —C(CH₃)₂CH₂— |
| Cl | —CH₂CH(CH₃)— | F | —CH₂CH(CH₃)— |
| OCH₃ | —CH₂CH(CH₃)— | F | —CH(CH₃)CH₂— |
| H | —CH(C₂H₅)CH₂— | Br | —CH(CH₃)CH₂— |
| Cl | —CH(C₂H₅)CH₂— | F | —CH(CH₃)CH(CH₃)— |
| H | —C(CH₃)₂CH₂— | F | —CH(C₂H₅)CH₂— |
| Cl | —C(CH₃)₂CH₂— | F | —CH(C₂H₅)CH(CH₃)— |
| Cl | —CH₂CH₂— | OCH₃ | —CH(n-C₃H₇)CH₂— |
| F | —CH₂CH₂— | Br | —CH(n-C₃H₇)CH₂— |
| Br | —CH₂CH₂— | CH₃ | —CH₂CH₂— |
| CH₃ | —CH₂CH₂— | CH₃ | —CH(CH₃)CH₂— |
| OCH₃ | —CH₂CH₂— | CH₃ | —CH₂CH(CH₃)— |
| CF₃ | —CH₂CH₂— | CH₃ | —CH(i-C₃H₇)CH₂— |
| CF₃ | —CH₂CH₂— | F | —CH(CH₃)C(CH₃)₂— |
| CF₃ | —CH₂CH(CH₃)— | Cl | —CH(CH₃)C(CH₃)₂— |
| CF₃ | —C(CH₃)₂CH₂— | Br | —CH(CH₃)CH(CH₃)— |

PREPARATION B 2-(1,3-Oxazin-2-yl)-3-methylquinoxaline-1,4-dioxide a. 2-(5,6-Dihydro-4H-1,3-oxazin-2-yl)-3-methylquinoxaline-1,4-dioxide.

To a solution of diketene (4.2 g.) in chloroform (75 ml.) is added 3-bromopropylamine hydrobromide (10.4 g.) in water (20 ml.) at 0° C. and the mixture stirred thoroughly. A solution of sodium hydroxide (2.0 g. in 10 ml. of water) is then added over a 20 minute period at 0° C. and the mixture stirred for an additional hour at room temperature. The chloroform phase is separated, dried over sodium sulfate and evaporated to give N-(3-bromopropyl)-acetoacetamide as a white solid.

The N-(3-bromopropyl)acetoacetamide is then added to a solution of benzofuroxan (6.8 g.) in ethanol (75 ml.) and an excess of ammonia gas passed into the solution (until solution is saturated) while holding the temperature below 30° C. The reaction mixture is allowed to stand overnight at room temperature and is then filtered and the solid product recrystallized from methanol, 2.0 g., m.p. 218° C.

b. The following intermediates, previously unreported in the chemical literature, are prepared by the above procedure employing the appropriate starting halopropylamine and benzofuroxan:

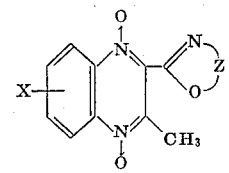

| X (6 or 7) | Z |
|---|---|
| H | —CH(CH₃)CH₂CH₂— |
| H | —CH₂CH₂CH₂— |
| Cl | —CH(CH₃)CH₂CH₂— |
| Cl | —CH₂CH₂CH₂— |
| OCH₃ | —CH₂CH₂CH₂— |
| CH₃ | —CH₂CH₂CH₂— |
| CF₃ | —CH₂CH₂CH₂— |
| F | —CH₂CH₂CH₂— |
| Br | —CH₂CH₂CH₂— |
| CF₃ | —CH(CH₃)CH₂CH₂— |
| OCH₃ | —CH(CH₃)CH₂CH₂— |
| F | —CH(CH₃)CH₂CH₂— |
| Cl | —CH₂CH(CH₃)CH₂— |
| Cl | —CH₂CH₂CH(CH₃)— |
| Cl | —CH₂C(CH₃)₂CH₂— |
| Cl | —CH(CH₃)CH₂CH(CH₃)— |
| CF₃ | —CH(CH₃)CH₂CH(CH₃)— |
| F | —CH(CH₃)CH₂CH(CH₃)— |
| CH₃ | —CH(C₂H₅)CH₂CH₂— |
| F | —CH(C₂H₅)CH₂CH₂— |
| Cl | —CH₂CH(n-C₃H₇)CH₂— |
| H | —CH₂CH(n-C₃H₇)CH₂— |
| H | —CH(CH₃)CH₂CH(CH₃)— |
| H | —CH(CH₃)CH₂C(CH₃)₂— |
| Br | —C(CH₃)₂CH₂CH₂— |
| CH₃ | —C(CH₃)₂CH₂CH₂— |
| OCH₃ | —CH₂C(CH₃)(C₂H₅)CH₂— |
| H | —CH₂C(CH₃)(C₆H₅)CH₂— |
| Cl | —CH₂CH(i-C₃H₇)CH₂— |
| H | —CH₂CH(i-C₃H₇)CH₂— |
| F | —CH(CH₃)CH(CH₃)CH(CH₃)— |

PREPARATION C

2-Quinoxalinecarboxylic Acid, ω-aminoalkyl ester, 1,4-dioxide Salts a. 3-Methyl-2-quinoxalinecarboxylic, 2-aminoethyl ester, 1,4-dioxide, hydrochloride.

To a solution of 2 ml. of water and 8 ml. of ethanol is added 0.98 ml. of 12N hydrochloric acid followed by 2-(2-oxazolin-2-yl)-3-methylquinoxaline-1,4-dioxide (1.25 g.). The resulting yellow solution is allowed to stir at room temperature for 30 minutes, after which it is concentrated to dryness under reduced pressure. The residual solid is slurried in ethyl acetate, filtered and dried, 1.26 g., m.p. 186°–188° C.

Anal. Calcd. for $C_{12}H_{14}O_4N_3Cl$: C, 48.0; H, 4.7; N, 14.0.

Found: C, 47.8; H, 4.8; N, 13.9.

b. Starting with the requisite 2-(1,3-oxazacycloalkyl)quinoxaline-1,4-dioxide and acid reagent, and repeating the above procedure, the following 2-quinoxalinecarboxylic acid, ω-aminoalkyl ester, 1,4-dioxide addition salts previously unreported in the chemical literature are prepared:

| X (6 or 7) | Z | HA* |
|---|---|---|
| H | —CH₂CH(CH₃)— | a |
| Cl | —CH₂CH(CH₃)— | a |
| OCH₃ | —CH₂CH(CH₃)— | a |
| H | —CH(C₂H₅)CH₂— | a |
| Cl | —CH(C₂H₅)CH— | a |

| X | Z | HA* |
|---|---|---|
| H | —C(CH₃)₂CH₂— | a |
| Cl | —C(CH₃)₂CH₂— | a |
| Cl | —CH₂CH₂— | a |
| F | —CH₂CH₂— | a |
| Br | —CH₂CH₂— | b,c,d |
| CH₃ | —CH₂CH₂— | b,c,d |
| OCH₃ | —CH₂CH₂— | b,c,d |
| CF₃ | —CH₂CH₂— | b,c,d |
| CF₃ | —CH₂CH(CH₃)— | b,c,d |
| CF₃ | —CH(CH₃)CH₂— | b,c,d |
| CF₃ | —CH₂C(CH₃)₂— | b,c,d |
| OCH₃ | —CH₂C(CH₃)₂— | b,c,d |
| CH₃ | —CH₂CH₂CH₂— | a |
| CF₃ | —CH₂CH₂CH₂— | a |
| F | —CH₂CH₂CH₂— | a |
| Br | —CH₂CH₂CH₂— | a |
| CF₃ | —CH₂CH₂CH(CH₃)— | a |
| CF₃ | —CH(CH₃)CH₂CH(CH₃)— | a |
| F | —CH(CH₃)CH₂CH(CH₃)— | a |
| Br | —CH₂CH₂C(CH₃)₂— | a |
| CH₃ | —CH₂C(CH₃)₂— | a |
| OCH₃ | —CH₂C(CH₃)(C₂H₅)CH₂— | a |
| H | —CH₂C(CH₃)(C₂H₅)CH₂— | a |
| Cl | —CH₂CH(i-C₃H₇)CH₂— | a |
| H | —CH₂CH(i-C₃H₇)CH₂— | a |
| F | —CH(CH₃)CH₂— | a |
| F | —CH₂CH(CH₃)— | b, c, d |
| Br | —CH₂CH(CH₃)— | b, c, d |
| F | —CH(CH₃)CH(CH₃)— | b, c, d |
| F | —CH₂CH(C₂H₅)— | b, c, d |
| F | —CH(CH₃)CH(C₂H₅)— | b,c,d |
| OCH₃ | —CH₂CH(n-C₃H₇)— | b,c,d |
| Br | —CH₂CH(n-C₃H₇)— | b,c,d |
| CH₃ | —CH₂CH₂— | b,c,d |
| CH₃ | —CH₂CH(CH₃)— | b,c,d |
| CH₃ | —CH(CH₃)CH₂— | b,c,d |
| CH₃ | —CH₂CH(i-C₃H₇)— | b,c,d |
| F | —C(CH₃)₂CH(CH₃)— | b,c,d |
| Cl | —C(CH₃)₂CH(CH₃)— | b,c,d |
| Br | —CH(CH₃)CH(CH₃)— | b,c,d |
| H | —CH₂CH₂— | e |
| H | —CH₂CH₂CH₂— | f |
| OCH₃ | —CH₂CH₂CH(CH₃)— | a |
| F | —CH₂CH₂CH(CH₃)— | a |
| Cl | —CH₂CH(CH₃)CH₂— | a |
| Cl | —CH(CH₃)CH₂CH₂— | a |
| Cl | —CH₂C(CH₃)₂CH₂— | a |
| Cl | —CH(CH₃)CH₂CH(CH₃)— | a |
| CH₃ | —CH₂CH₂CH(C₂H₅)— | a |
| F | —CH₂CH₂CH(C₂H₅)— | a |
| Cl | —CH₂CH(n-C₃H₇)CH₂— | a |
| H | —CH₂CH(n-C₃H₇)CH₂— | a |
| H | —CH(CH₃)CH₂CH(CH₃)— | a |
| H | —C(CH₃)₂CH₂CH(CH₃)— | a |
| F | —CH(CH₃)CH₂CH(CH₃)— | a |

*ᵃHCl; ᵇHBr; ᶜHNO₃; ᵈH₂SO₄; ᵉp-toluenesulfonic acid; ᶠH₃PO₄.

c. 3-Methyl-2-quinoxalinecarboxylic acid, 2-aminoethyl ester, 1,4-dioxide benzoate.

To a solution of 3-methyl-2-quinoxalinecarboxylic acid, 2-aminoethyl ester, 1,4-dioxide hydrochloride (3.0 g.; 0.01 mole) dissolved in water (10 ml.) at 0° C. is added silver oxide (1.25 g.; 0.005 mole) and the resulting suspension allowed to stir briefly in the cold followed by centrifugation of the solid suspension. The supernatent containing the free base is treated with benzoic acid (1,2 g.; 0.01 mole) in methanol (10 ml.) and the resulting suspension allowed to stir briefly in the cold followed by centrifugation of the solid suspension. The supernatent containing the free base is treated with benzoic acid (1.2 g.; 0.01 mole) in methanol (10 ml.) and the resulting solution concentrated to dryness in vacuo. The residual benzoate salt is triturated with ethyl acetate and suction filtered.

d. Repeating the above procedure, Preparation C-(c), and employing the requisite 2-ω-aminoalkyl hydrochloride salts, the following salts are prepared:

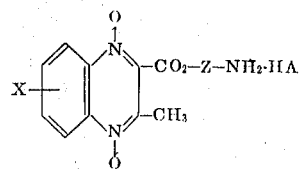

| X (6 or 7) | Z | HA* |
|---|---|---|
| F | —CH₂CH₂— | a,b |
| Br | —CH₂CH₂— | a,b |
| CH₃ | —CH₂CH₂— | a,b |
| OCH₃ | —CH₂CH₂— | a,b |
| CF₃ | —CH₂CH₂— | a,b |
| CF₃ | —CH₂CH(CH₃)— | a,b |
| CF₃ | —CH(CH₃)CH₂— | a,b |
| CF₃ | —CH₂C(CH₃)₂— | a,b |
| OCH₃ | —CH₂C(CH₃)₂— | a,b |
| F | —CH(CH₃)CH₂— | a,b |
| F | —CH₂CH(CH₃)— | a,b |
| Br | —CH₂CH(CH₃)— | a,b |
| H | —CH₂CH₂CH(CH₃)— | c,d,e |
| Cl | —CH₂CH₂CH(CH₃)— | c,d,e |
| OCH₃ | —CH₂CH₂CH₂— | c,d,e |
| F | —CH(CH₃)CH(CH₃)— | a,b |
| F | —CH₂CH(C₂H₅)— | a,b |
| F | —CH(CH₃)CH(C₂H₅)— | a,b |
| OCH₃ | —CH₂CH(n-C₃H₇)— | a,b |
| Br | —CH₂CH(n-C₃H₇)— | a,b |
| CH₃ | —CH₂CH₂— | a,b |
| CH₃ | —CH₂CH(CH₃)— | a,b |
| CH₃ | —CH(CH₃)CH₂— | a,b |
| CH₃ | —CH₂CH(i-C₃H₇)— | a,b |
| F | —C(CH₃)₂CH(CH₃)— | a,b |
| Cl | —C(CH₃)₂CH(CH₃)— | a,b |
| Br | —CH(CH₃)CH(CH₃)— | a,b |
| H | —CH₂CH₂CH₂— | c,d,e |
| Cl | —CH₂CH₂CH₂— | c,d,e |

*ᵃHF; ᵇHI; ᶜCH₃CO₂H; ᵈC₆H₅CO₂H; ᵉHO₂CCO₂H.

What is claimed is:

1. A process for the preparation of quinoxaline-di-N-oxides of the formula:

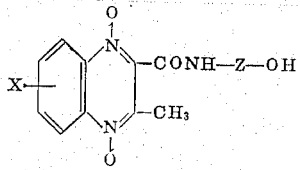

which comprises contacting a compound of the formula:

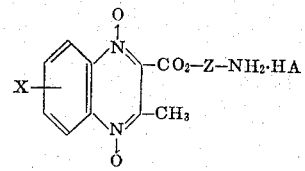

wherein X is a substituent at the 6- or 7-position selected from the group consisting of hydrogen, fluorine, chlorine, bromine, trifluoromethyl, methyl and methoxy; Z is selected from the group consisting of ethylene, propylene and alkyl substituted ethylene and propylene said alkyl groups containing from one to three carbon atoms; and A is an acid anion, with at least an equivalent amount of a base in a reaction-inert solvent at 10°–60° C.

2. The process of claim 1 wherein the reaction-inert solvent is aqueous sodium hydroxide and the pH is 7–14.

3. The process of claim 2 wherein X is hydrogen, Z is ethylene and A is chloride.

4. The process of claim 2 wherein the pH is 8–9.

5. The process of claim 1 wherein said base is selected from the group consisting of alkali metal and alkali earth metal hydroxides, hydrides, alkoxides, carbonates and bicarbonates, mono-, di- and tri-(lower)alkylamines, N-(lower)alkylpiperidines, N-(lower)alkylpyrrolidines and N-(lower)alkylmorpholines.

* * * * *